(12) United States Patent
Bowman et al.

(10) Patent No.: US 7,212,882 B2
(45) Date of Patent: May 1, 2007

(54) TOOLING DATA STRUCTURE

(75) Inventors: Andrew P. Bowman, Sumner, WA (US); Mark E. Van Horne, Bellevue, WA (US); Geoffrey M. Lindblad, Snohomish, WA (US); Milton O. Olson, Kirkland, WA (US); Craig A. Neidig, Issaquah, WA (US); Allan M. Hansen, Glencoe, MO (US); Ronald H. Eastman, Wichita, KS (US); Lynda L. Tuttle, Wichita, KS (US)

(73) Assignee: The Boeing Company, Chicago, IL (US)

( * ) Notice: Subject to any disclaimer, the term of this patent is extended or adjusted under 35 U.S.C. 154(b) by 656 days.

(21) Appl. No.: 10/650,598

(22) Filed: Aug. 28, 2003

(65) Prior Publication Data

US 2005/0049738 A1     Mar. 3, 2005

(51) Int. Cl.
*G06F 19/00*    (2006.01)
(52) U.S. Cl. .................................. 700/179; 700/182
(58) Field of Classification Search ............. 700/97, 700/182, 114, 103–105, 179, 169, 175; 705/26; 703/1; 715/964; 709/224
See application file for complete search history.

(56) References Cited

U.S. PATENT DOCUMENTS

| | | | |
|---|---|---|---|
| 6,467,527 B1 * | 10/2002 | Kubota et al. | 164/113 |
| 6,616,034 B2 * | 9/2003 | Wu et al. | 235/375 |
| 6,647,305 B1 * | 11/2003 | Bigelow | 700/97 |
| 6,749,029 B2 * | 6/2004 | Alft et al. | 175/24 |
| 2002/0188910 A1 * | 12/2002 | Zizzo | 716/1 |

* cited by examiner

*Primary Examiner*—Kidest Bahta
(74) *Attorney, Agent, or Firm*—Lee & Hayes, PLLC

(57) ABSTRACT

A data structure and computer-program product for providing tool design and instructions in a dynamic manufacturing environment are provided. The data structure includes a plurality of objects for abstracting tool resources. Each object represents all changes that relate to one of a tool or a part of a tool. The instances of the objects are based on product information and are generated for associated instructions for tool usage in the manufacturing environment. The product information includes information identifying configuration of the product and a definition of a functional deliverable of the product. The information identifying configuration of the product includes product option information. The functional deliverable of the product includes production line number where the object applies.

16 Claims, 8 Drawing Sheets

| Plan | IP 73456 to build up panel | | Availability |
|---|---|---|---|
| OP 10 | Retrieve Tool | AJ73W12-1_Tool | 1→∞ |
| OP 20 | Attach 73W12-1 panel to  AJ73W12-1_P1 Main Assy with AJ73W12-1_P4 Pin | | 1→∞ |
| OP 30 | Install AJ73W12-1_P2 stiffener locator | | 1→∞ |
| OP 40 | Install AJ73W12-1_P3 stiffener locator | | 1→∞ |
| OP 50 | Drill holes x, y, v, z with AJ73W12-1_P1 drill feature | | 1→∞ |
| OP 60 | Locate 45FR23  AJ73W12-1_P2 stiffener locator and  AJ73W12-1_P3 stiffener locator | | 1→∞ |

Plan     IP 73456 to build up panel

OP 10    Retrieve Tool (Tool | AJ73W12-1_A)

OP 20    Attach 73W12-1 panel to (P1 | AJ73W12-1_1_A) Main Assy (P4 | AJ73W12-1_8_A) pin OP 30    Install (P2 | AJ73W12-1_6_A) stiffener locator OP 40    Install (P3 | AJ73W12-1_7_A) stiffener locator OP 50    Drill holes x, y, v, z with (P1 | AJ73W12-1_5_A) drill feature OP 60    Locate 45FR23 to (P2 | AJ73W12-1_6_A) stiffener locator and (P3 | AJ73W12-1_7_A) stiffener locator

FIG. 4.

Plan IP 73456 to build up panel

OP 10  Retrieve Tool (Tool | AJ73W12-1_B)

OP 20  Attach 73W12-1 panel to (P1 | AJ73W12-1_1_B)
       Main Assy (P4 | AJ73W12-1_8_A) pin OP 30  Install (P2 | AJ73W12-1_6_A) stiffener locator OP 40  Install (P3 | AJ73W12-1_7_A) stiffener locator OP 50  Drill hole x, y, v, z with (P1 | AJ73W12-1_5_B) drill feature OP 60  Locate 45FR23 to (P2 | AJ73W12-1_6_A) stiffener locator
       and (P3 | AJ73W12-1_7_A) stiffener locator

FIG. 7.

TOOLING DATA STRUCTURE

FIELD OF THE INVENTION

This invention relates generally to manufacturing environments and, more particularly, to computer programs for providing proper tooling instructions within a manufacturing environment.

BACKGROUND OF THE INVENTION

For many years, two-dimensional (2D) paper drawings were used for defining master product definitions. Paper communication among members of an Integrated Product Team was a challenge, because of the slowest related to paper communication. For example, a design group would create 2D drawings for defining engineering assemblies. A manufacturing group used the 2D engineering drawings to understand the intents of the design group, develop manufacturing assemblies and build plans, and communicate intents to a tooling group. The tooling group created tools and tool instructions to comply with the build plan. In many cases, multiple variations of a tool were developed in order to comply with different product variations included in a build plan.

Tool operators received the build plan from the manufacturing group and tooling information from the tooling group. Because the build plan was developed before tools were ever created or specified, the tool operators didn't know the specific tool version that was required by just reviewing the build plan. As a result, the tool operators spent a lengthy amount of time reviewing information provided by the tooling group in order to determine the correct tool configuration for the product option and line number.

In light of discrepancies that often occur with current tooling manufacturing systems and methods, it would be desirable to consistently provide tool operators with complete information regarding correct tool configuration for a product option and line number. Thus, there exists an unmet need for a software application program that provides accurate tool information without requiring lengthy and expensive updates to the underlying supporting application program.

SUMMARY OF THE INVENTION

The present invention provides a data structure and computer-program product for creating tool design and instructions in a dynamic manufacturing environment. The data structure includes a plurality of objects for abstracting tool resources. Each object represents all changes that relate to one of a tool or a part of a tool. The instances of the objects are based on product information and are generated for associated tool usage instructions.

In one aspect of the invention, the product information includes information identifying configuration of the product and a definition of a functional deliverable of the product. The information identifying configuration of the product includes product option information. The functional deliverable of the product includes a production line number where applicable.

In another aspect of the invention, an instance of the object includes version information.

BRIEF DESCRIPTION OF THE DRAWINGS

The preferred and alternative embodiments of the present invention are described in detail below with reference to the following drawings.

FIG. 4 shows installation instructions of the build plan based on the tool shown in FIG. 2;

FIG. 7 shows installation instructions received by a tool operator based on the tool shown in FIG. 6.

DETAILED DESCRIPTION OF THE INVENTION

The present invention is a software application program (data structure) for providing accurate up-to-date tooling information within a build plan for a product.

Figure 1:
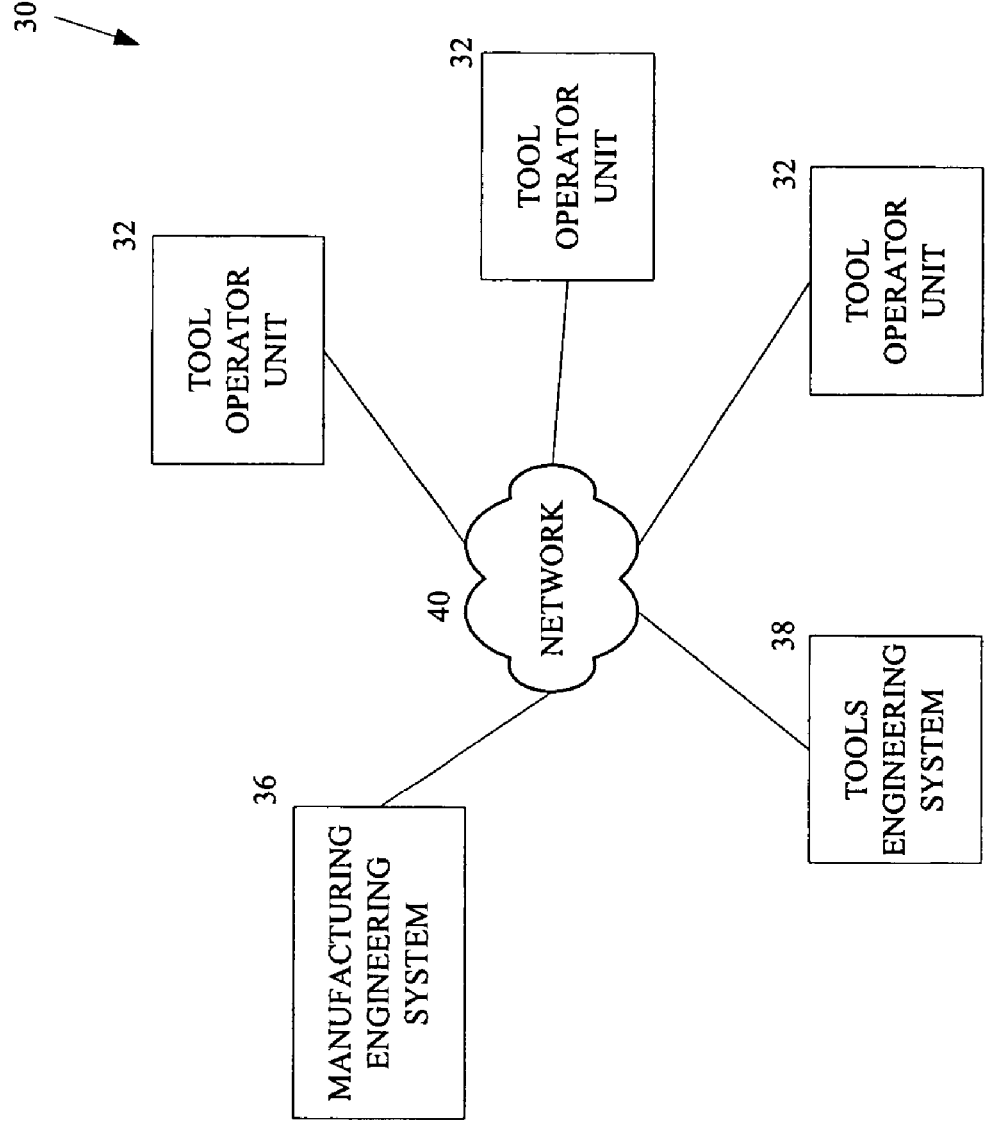
FIG. 1 is a block diagram of an exemplary system formed in accordance with the present invention.

FIG. 1 illustrates an exemplary system 30 that executes the software application program formulated in accordance with the present invention and includes components for interacting with the software application program. The components of the system 30 enable a tool engineer and a manufacturing engineer to create a build plan that includes accurate tooling information even when multiple versions of a tool may exist. This system 30 includes multiple tool operator units 32, a manufacturing engineering system 36, and a tool engineering system 38. The components of the system 30 are suitably connected to a public or private data network 40, but could be included on a stand-alone general purpose personal computer. The components of the system 30 are various types of computer-based user interface computer products, such as without limitation a personal computer with computer-aided design capabilities, that allow input, edits, or review of the build plan as it relates to a manufacturing environment. The manufacturing engineering system 36 allows the manufacturing engineer to determine tool requirements for a build plan. The tool engineering system 38 allows tool engineers to design specific tools based on the requirements set out by the manufacturing engineer. The tool operator units 32 allow tool operators to review installation instructions of a build plan, whereby specific tool information is included in the steps within the installation instructions. It will be appreciated that each of the components of the system 30 can be distributed across the network 40 or can be in wired or wireless communication with the network 40.

The data structure of the present invention is an object-oriented based data structure that allows for the association of tools with steps within installation instructions of a build plan. The data structure includes a tool resource object (TRO). The TRO is a generic handle that is included within the build plan. The TRO allows tooling personnel to make changes to a tool within a tool product structure without requiring a manufacturing engineer to make changes to tool references (call outs) within the installation instructions of a build plan. Without the TRO, the manufacturing engineer would need to attach specific instances of tool parts within the tool product structure to specific process steps within the installation instructions of the build plan. Thus, due to the inclusion of specific steps within the installation instructions of the build plan that call out tool usage, every change to the tool would instigate a change to every installation instruction that calls out usage of the tool or parts of the tool.

Because the TRO serves as a persistent generic handle within the build plan, the TRO resolves itself to the appropriate attached instance (geometry) based on applicability and availability information. Therefore, because specific instances of the TRO resolve any changes that applied to a tool, there is no need to have the manufacturing engineer become involved in updating the build plan every time a tool engineer makes a change to a tool. An instance of a tool's product specification (i.e., configuration level of the tool) and instances of each portion of the tool needing to be used within the installation instructions of the build plan are attached to the respective TRO (generic handle). Each portion of the tool, as it evolves through change management, is attached to the respective TRO. TRO's are created under an engineering product or a tool product. TRO's are resolvable within the context of the product that defines the context of the installation instructions of the build plan. Regardless of whether the TRO is created within the engineering product or the tool product, the TRO is always resolved within the context of the engineering product. The TRO has instances of product specifications, instances of components, or instances of part references attached thereto.

Each evolution of a portion of a tool includes an effectivity statement. The effectivity statement identifies what product (e.g., option or line number) applies to the tool portion. When an installation instruction of a build plan is filtered (resolved) for specific product configuration, the TRO's within the build plan resolve to correctly show which tool instances are attached according to the specific product configuration.

The data structure includes a tool product instance object that distinguishes an instance of a tool product specification from an instance of the engineering part or product. The tool product instance object is very similar to a part instance. [HOW DOES THE TOOL PRODUCT INSTANCE OBJECT RELATE TO THE TRO?]

One non-limiting example application program that can support creation and use of the TRO and tool product instance object is CATIA V5.

Figure 2:
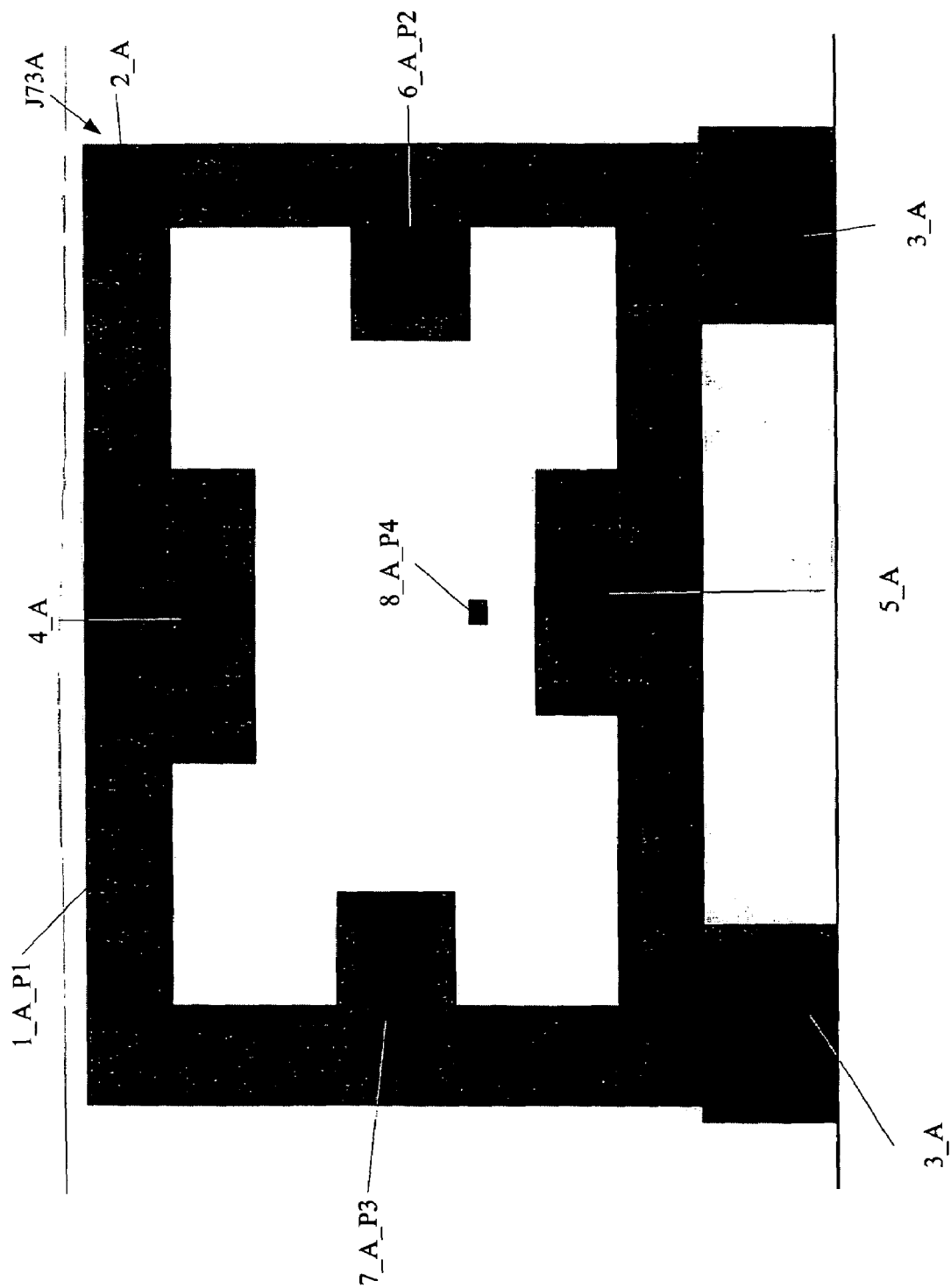
FIG. 2 is an abstract view of a tool used for a product option and line numbers.

Referring now to FIG. 2, a graphical representation of an example tool J73A that is used by a tool operator to perform drilling of holes for a hinge in a cargo door panel of an aircraft (not shown) is shown. The tool J73A is identified as version A of tool J73. The tool J73A includes four major parts: a main assembly 1_A_P1; a right stiffener locator 6_A_P2; a left stiffener locator 7_A_P3; and a pin 8_A_P4. The main assembly 1_A_P1 includes a frame 2_A, two instances of base 3_A, a fixed locator 4_A, and a drill feature 5_A.

Figure 3:
FIG. 3 illustrates an exemplary build plan.
Figure 3:
Figure 3:

Referring now to FIG. 3, a portion of a build plan 80 for build-up of a door panel is shown. The build plan 80 includes plan steps OP10–OP60. The build plan 80 also includes corresponding action descriptions for each step and availability. At step OP10, the build plan 80 indicates to retrieve tool AJ73W12-1 with availability of one to infinity. A tool symbol for tool AJ73W12-1 is a TRO for that tool. At step OP20, the build plan 80 describes attaching a part identified as 73W12-1 door panel to the TRO identified as AJ73W12-1_P1 main assembly with the TRO AJ73W12-1_P4 pin. At step OP30, the build plan 80 instructs installation of the TRO AJ73W12-1_P2 stiffener locator and at step OP40, installation of the TRO AJ73W12-1_P3 stiffener locator. At step OP50, an instruction to drill holes x, y, v, z with the TRO AJ73W12-1_P1 drill feature is presented. Then, at step OP60, instructions to locate part 45FR23 to the TRO AJ73W12-1_P2 stiffener locator and the TRO AJ73W12-1_P3 stiffener locator. Thus, for each step in the build plan 80 where a tool or a part of a tool is required, all that is presented in the build plan 80 is the associated TRO.

Referring now to FIG. 4, installation instructions 100 of the build plan 80 (FIG. 3) are illustrated. The installation instructions 100 instruct an operator of the tool J73A to drill holes in a cargo door panel. The installation instructions 100 include instances of the corresponding TROs presented in the build plan 80. At OP1O, the tool operator is instructed to retrieve tool AJ73W12-1_A. At OP 20, the operator is instructed to attach the cargo door panel to the main assembly (P1/AJ73W12-1_1_A) using the pin (P4/AJ73W12-1_8_A). At OP30, the operator is instructed to install the stiffening locator (P2/AJ73W12-1_6_A). At OP40, the operator is instructed to install stiffening locator (P3/AJ73W12-1_7_A). At OP50, the operator is instructed to drill holes x, y, v, and z with the drill features (P1/AJ73W12-1_5_A). At OP60, the operator is instructed to locate part 45FR23 to the stiffener locators (P2/AJ73W12-1_6_A and P3/AJ73W12-1_7_A).

Figure 5:
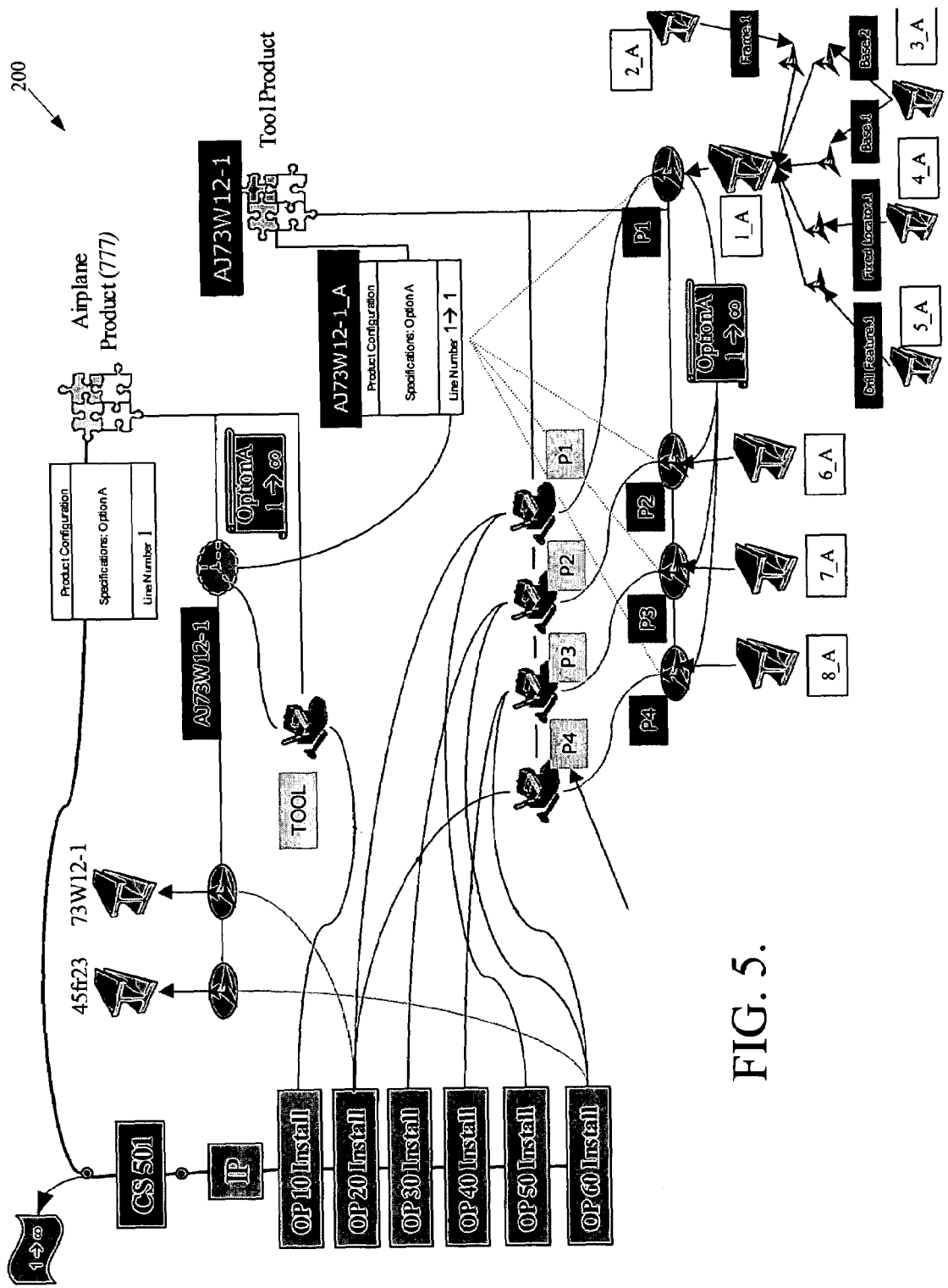
FIG. 5 is a diagram of a data relationship with respect to the build plan shown in FIG. 3 and the installation instructions shown in FIG. 4.

Referring now to FIG. 5, a pictorial view 200 of the TROs used within the build plan 80 (FIG. 3) and instances of the TROs in the installation instructions 100 (FIG. 4) are shown. The view 200 includes the operational steps OP10–OP60 and links to the TRO's associated with each of those steps. Attached to each of the TRO's are instances of the TRO's based on a definition of a functional deliverable of the product and information identifying configuration of the product (e.g. option and line number).

In the example above, in-service experience of the cargo door panel generated by the tool J73A indicates that a hinge attached to the cargo door panel at the holes that were drilled by the drill feature 5_A of the main assembly 1_A_P1 of the tool J73A may fail prematurely. Further, aircraft engineers determine that a different bolt pattern for the hinge on the cargo door panel will fix the problem. Accordingly, a change order for the same cargo door panel option starting at product line 5 is generated by a manufacturing engineer using the manufacturing engineering system 36. The change order is sent to the tool engineering system 38 in order to change the tool J73A for drilling the newly designated hole pattern. In this example, a tool engineer determines that tool J73A cannot be used to drill the new pattern. The tool engineer designs a new tool detail, i.e. drill feature, that is then fabricated and designated as tool J73B. The manufacturing engineers do not need to change the build plan because the general instruction to drill holes stays the same. The only thing that changes in this example is the tool version. Instead of using tool J73A, the tool version J73B is used for the product line 5 and greater.

Figure 6:
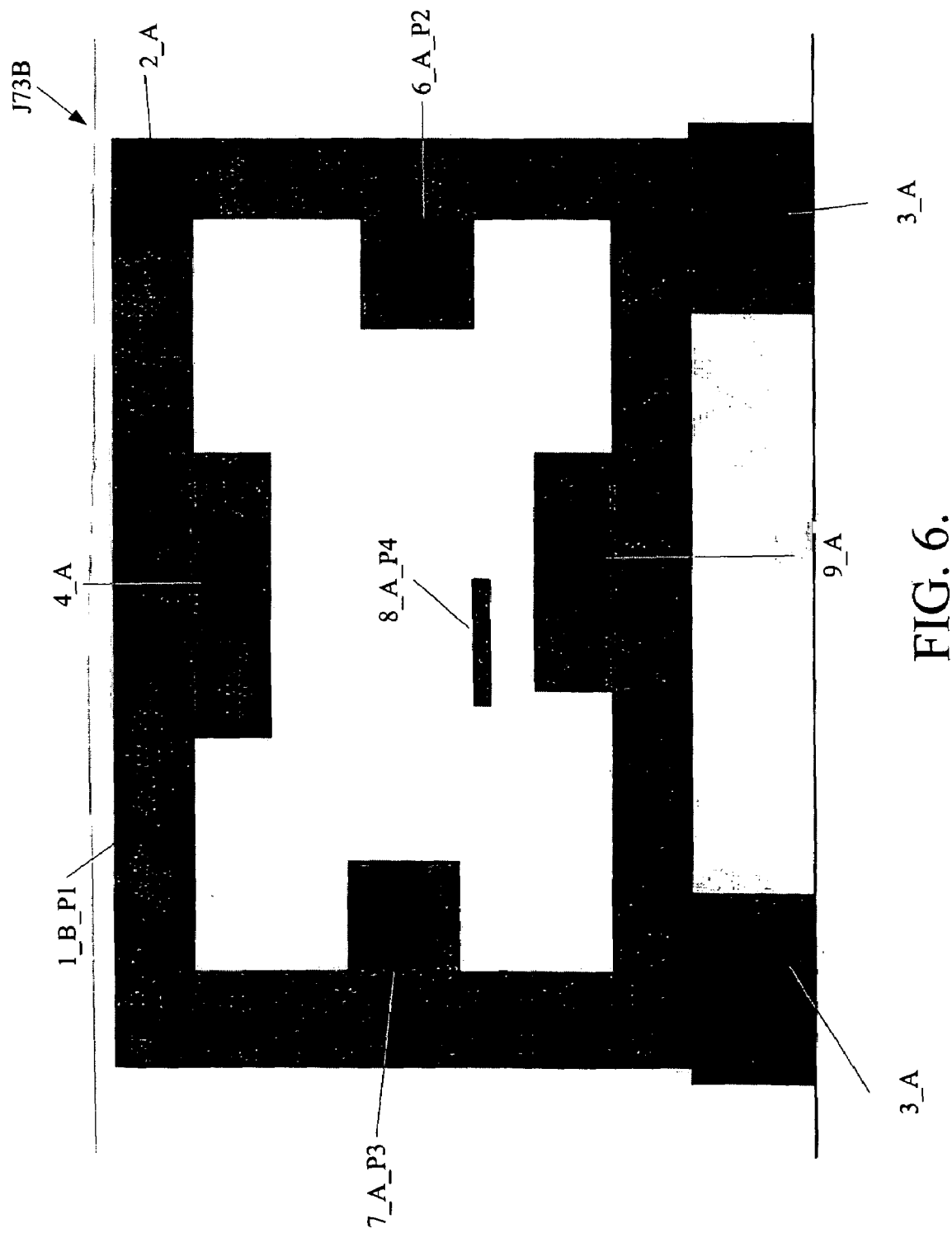
FIG. 6 is an abstract view of an altered version of the tool shown in FIG. 2 that is used for a line number or option variation of the product.

FIG. 6 illustrates the reworked tool J73B. The only feature that changed from the tool J73A to the new tool J73B is that the hole drill feature 5_A is replaced with a new drill feature 9_A. The new drill feature 9_A was designed in order to drill holes according to the new drill pattern. Since a subcomponent of the main assembly has changed, the main assembly is now given a new version number 1_B_P1. Only the instances of the TRO's have changed, thus, the build plan 80 (FIG. 4) remains the same.

FIG. 7 illustrates installation instructions 250 for producing a cargo door panel option A, which is the same option as that requested for the build plan 80, but at product line 7. Because the tool operator is to build option A, product line 7, some of the instances of the TROs are different from the instances in the initial scenario (FIGS. 2 and 4) is used. The installation instructions 250 are substantially the same as that for the installation instructions 100 (FIG. 4), except at step OP10 the operator is instructed to retrieve version B of the tool J73, at step OP20, the main assembly 1_B_P1 is called out, and the drill feature 9_A is called out at step OP50.

Figure 8:
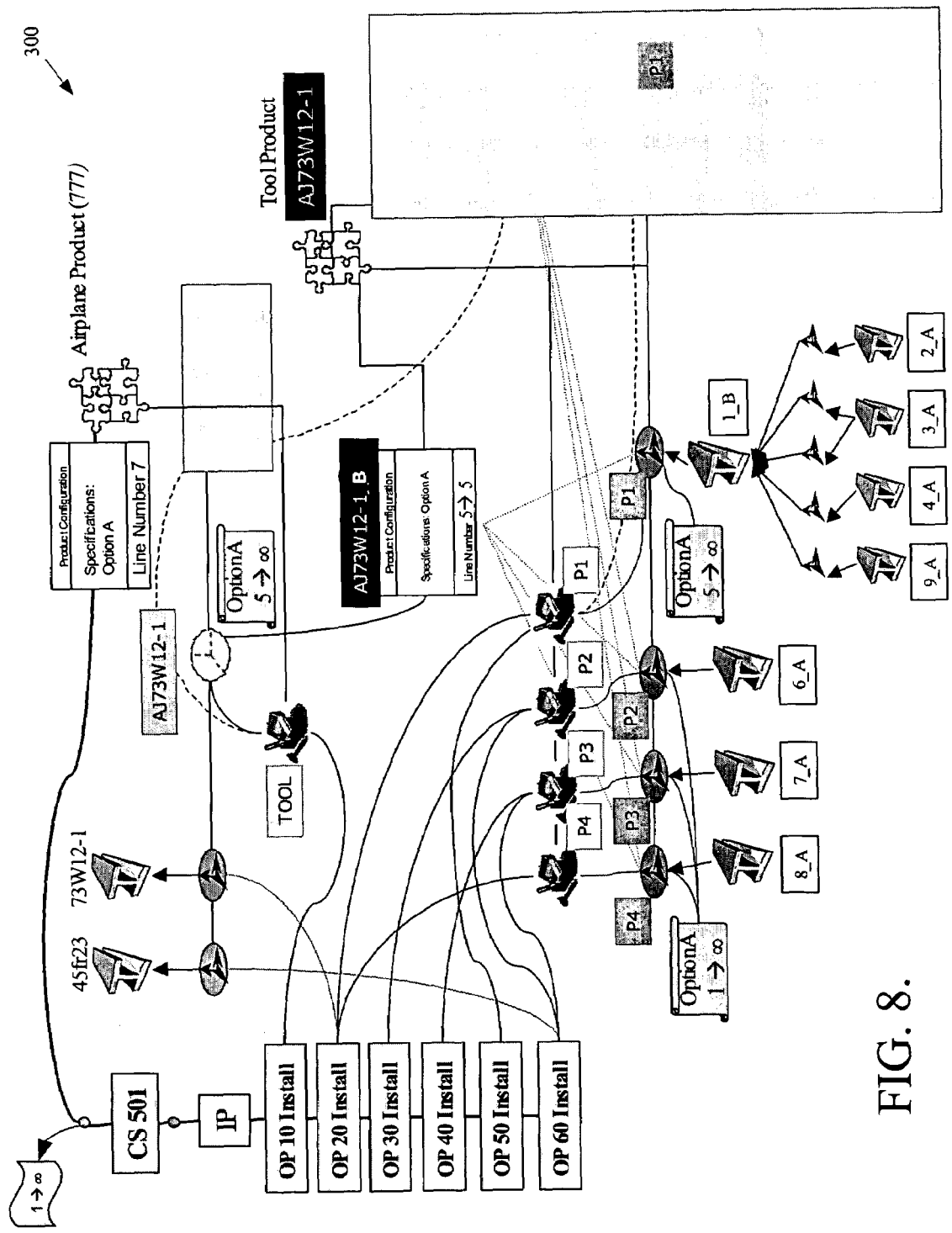
FIG. 8 is a diagram of the relations of objects as they relate to the installation instructions in FIG. 7.

Referring now to FIG. 8, a data structure 300 associated with the installation instructions 250 (FIG. 7) for product build option A, product line number 7 is graphically illustrated. The data structure 300 illustrates that all the TROs for the tool and the parts of the tool remain the same, yet specific instances of some of the TROs are different in order to reflect the change(s) made to the drill feature.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A data structure residing on a computer-readable medium for providing tool design and instructions in a dynamic manufacturing environment, the data structure comprising:
   at least one tool object, the at least one tool object configured to be referenced in product information, the at least one tool object configured to be changed without causing the product information to be changed, and the at least one tool object configured to represent all of a plurality of versions of a tool or a part of a tool; and
   a tool usage instruction generator,
   wherein the instruction generator is configured to generate and output at least one instruction identifying which version of the tool or the part of the tool to be used in the manufacturing environment,
   wherein the version of the tool or the part of the tool to be used is based on the tool object,
   wherein the version of the tool or the part of the tool is based on product information, and
   wherein the tool usage instruction generator is configured to output the generated tool usage instruction.

2. The data structure of claim 1, wherein the product information includes information identifying configuration of the product.

3. The data structure of claim 2, wherein the information identifying configuration of the product includes product option information.

4. The data structure of claim 2, wherein the product information includes definition of a functional deliverable of the product.

5. The data structure of claim 4, wherein the functional deliverable of the product includes a production line number where the tool object applies.

6. The data structure of claim 1, wherein an instance of the tool object includes version information.

7. A computer-program product residing on a computer-readable medium for performing a method of generating one or more installation instructions, the method comprising:
   receiving at least a portion of product information for a manufactured product and information identifying configuration of the manufactured product at an input of of a computer system;
   generating one or more installation instructions; and
   outputting the generated one or more installation instructions,
   wherein the portion of the product information received includes at least one tool object,
   wherein at least one of the generated one or more installation instructions identifies which version of a tool or a part of the tool to be used in a manufacturing environment,
   wherein the version of the tool or the part of the tool to be used is based on the tool object,
   wherein the at least one tool object is configured to represent all of a plurality of versions of a tool or a part of a tool, and
   wherein the version of the tool or the part of the tool is based on the product information.

8. The computer-program product of claim 7, wherein the product information includes information identifying configuration of the product.

9. The computer-program product of claim 8, wherein the information identifying configuration of the product includes product option information.

10. The computer-program product of claim 7, wherein the product information includes definition of a functional deliverable of the product.

11. The computer-program product of claim 10, wherein the functional deliverable of the product includes production line number where the tool object applies.

12. A computer-program product residing on a computer-readable medium for performing generation of one or more installation instructions, the computer-program product comprising:
    means for receiving a definition of a functional deliverable of a product and information identifying configuration of the product at an input of a computer system;
    means for generating one or more installation instructions; and
    means for outputting the generated one or more installation instructions,
    wherein the definition of the functional deliverable of the product received includes at least one tool resource object,
    wherein at least one of the generated one or more installation instructions identifies which version of a tool or a part of the tool to be used in a manufacturing environment,
    wherein the version of the tool or the part of the tool to be used is based on the tool resource object,
    wherein the at least one tool resource object is configured to represent all of a plurality of versions of a tool or a part of a tool, and
    wherein the version of the tool or the part of the tool is based on product information.

13. The computer-program product of claim 12, wherein the product information includes information identifying configuration of the product.

14. The computer-program product of claim 13, wherein the information identifying configuration of the product includes product option information.

15. The computer-program product of claim 12, wherein the product information includes definition of a functional deliverable of the product.

16. The computer-program product of claim 15, wherein the functional deliverable of the product includes production line number where the tool resource object applies.

* * * * *